United States Patent [19]

Zeitler et al.

[11] 4,020,025
[45] Apr. 26, 1977

[54] EXTRUDABLE FOAMABLE COMPOSITION COMPRISING AN OLEFIN POLYMER, A STYRENE POLYMER AND A HYDROGENATED STYRENE BUTADIENE BLOCK COPOLYMER

[75] Inventors: Gerhard Zeitler, Hessheim; Heinz Mueller-Tamm, Ludwigshafen, both of Germany

[73] Assignee: BASF Aktiengesellschaft, Ludwigshafen, Germany

[22] Filed: May 17, 1976

[21] Appl. No.: 686,901

Related U.S. Application Data

[63] Continuation of Ser. No. 467,256, May 6, 1974, abandoned.

[30] Foreign Application Priority Data

May 8, 1973 Germany .......................... 2323031
Mar. 22, 1974 Germany .......................... 2413863

[52] U.S. Cl. ........................ 260/2.5 HB; 260/2.5 E; 260/2.5 HA; 260/876 B; 260/880 B; 264/53; 264/DIG. 5; 264/DIG. 18

[51] Int. Cl.² .......................................... C08J 9/14

[58] Field of Search ...... 260/880 B, 876 B, 2.5 HB, 260/2.5 HA, 2.5 E

[56] References Cited

UNITED STATES PATENTS 3,250,731  5/1966  Buhl et al. ................. 264/DIG. 18
3,810,964  5/1974  Ehrenfreund ................. 264/DIG. 5

*Primary Examiner*—Morton Foelak
*Attorney, Agent, or Firm*—Johnston, Keil, Thompson & Shurtleff

[57] ABSTRACT

Foams of mixtures of polyolefins and styrene polymers are produced by mixing the polymers with low-boiling expanding agents in the presence of a hydrogenated styrene/butadiene block polymer or a graft polymer of styrene on a polyolefin at temperatures above the softening point of the polymer mixture and under a pressure which prevents foaming of the mixture, followed by extrusion of the foamable mixture into a zone of lower pressure. The resulting foams are resistant to organic solvents.

8 Claims, No Drawings

EXTRUDABLE FOAMABLE COMPOSITION COMPRISING AN OLEFIN POLYMER, A STYRENE POLYMER AND A HYDROGENATED STYRENE BUTADIENE BLOCK COPOLYMER

This is a continuation of application Ser. No. 467,256 filed May 6, 1974, now abandoned.

This application discloses and claims subject matter described in German Patent Applications P 23 23 031.1 and P 24 13 863.4, filed May 7, 1973 and Mar. 22, 1974.

This invention relates to a process for the manufacture of foams of mixtures of polyolefins and styrene polymers by mixing the polymers with low-boiling expanding agents at temperatures above the softening point of the polymer mixture and under a pressure above the vapor pressure of the expanding agent at the temperature of mixing, followed by extrusion of the mixture into a zone of lower pressure.

The above process makes it possible, for example, to manufacture foams of polystyrene. Panels having a thickness of from about 5 to 10 cm may be extruded. The resulting foams are rigid and have a density ranging from 20 to 50 g/l. Foams of polystyrene are particularly useful in the building industry in insulating materials. A drawback of these foams is their particularly high sensitivity to organic solvents, especially those used in paints or adhesives, such as aromatic or aliphatic hydrocarbons, chlorinated hydrocarbons, esters and ketones. Thus it is not possible to process these foams with adhesives based on solvents.

It is also known to prepare foams of polyolefins by the above process. The thickness of the extruded polyolefin foams, however, is not more than 1 cm and it is usually only possible to manufacture thin sections. The mixture containing expanding agent does foam on extrusion but, in the case of thicker sections, it is not possible to remove the residual heat quickly enough for the foam to solidify and maintain its share as extruded. Polyolefins can give flexible to semi-rigid foams.

It is an object of the invention to modify the above process in such a manner that thicker foamed sections having a thickness of, for example, more than 2 cm may be prepared from mixtures containing polyolefins, which foams are resistant to organic solvents and can thus be bonded with solvent-base adhesives.

This object is achieved in the present invention in that the polymer mixture contains from 10 to 95% by weight of a styrene polymer and that mixing of the polymers with the expanding agent is carried out in the presence of from 0.5 to 10% by weight, based on the polymer mixture, of a hydrogenated styrene/butadiene block polymer or a graft polymer of styrene on a polyolefin.

Surprisingly, this method gives foams which are resistant to organic solvents under normal conditions even when the content of polystyrene is high. It has been found that the styrene polymer is dispersed in the polyolefin. The particle size of the styrene polymers is less than 50 $\mu$ and preferably less than 10 $\mu$, the polyolefin forming the continuous phase.

The proportion of styrene polymer may be from 10 to 95% by weight. At low polystyrene contents the foams are semi-rigid, whilst they are rigid when the polystyrene content is high. The molecular weight of the styrene polymer is higher than that of the polyolefins. The melt index of the styrene polymer is generally below 2.5 g/10 min (200° C/5 kg) and preferably between 0.5 and 2 g/10 min. The styrene polymers used are polystyrene and poly($\alpha$-methylstyrene), copolymers of styrene and $\alpha$-methylstyrene or mixtures of said polymers.

Particularly suitable polyolfeins are the well-known polyethylenes and ethylene copolymers. Suitable polyethylene has a density of from 0.918 to 0.965 g/cm$^3$. Such polyethylenes are commercially available. They are manufactured by the high-pressure polymerization process or the well-known low-pressure process. Suitable ethylene copolymers contain, as comonomer, for example one or more of the following compounds: vinyl esters of carboxylic acids of from 2 to 4 carbon atoms, for example vinyl acetate and vinyl propionate, acrylates and methyacrylates derived from alcohols of from 1 to 10 carbon atoms, acrylic acid, methacrylic acid, fumaric acid, itaconic acid, maleic acid and esters of said carboxylic acids, carbon monoxide and propylene and butene-1. Other suitable polyolefins are propylene and mixtures of said polyolefins, for example mixtures of high-pressure and low-pressure polyethylenes, mixtures of polyethylene and ethylene/vinyl acetate copolymers, and mixtures of high-pressure polyethylene and polypropylene. The comonomer content of the ethylene copolymers is between 1 and 65% and preferably between 10 and 45% by weight. The melt index of the ethylene polymers may vary over a wide range and is preferably from 0.5 to 40 g/10 min. (190° C/2.16 kg). The mixtures of styrene polymer and polyolefin contain from 90 to 5% by weight of polyolfin.

The mixtures of polyolefin and styrene polymer are produced in the presence of from 0.5 to 10% and preferably from 2 to 8%, by weight of the polymer mixture, of a hydrogenated styrene/butadiene block polymer of a graft polymer of styrene on a polyolefin. The molecular weight of the hydrogenated styrene/butadiene block polymer, as determined by viscosity measurements, is from 3,000 to 800,000 and preferably from 10,000 to 100,000. The proportion of styrene therein should be from 10 to 80% and preferablyfrom 30 to 60% by weight. The polymer consists of individul blocks and may be composed of pure polynutadiene segments side-by-side with pure polystyrene segments or may contain polybutadiene segments containing small amounts of styrene side-by-side with pure polystyrene segments. The double bonds in the block copolymer should be hydrogenated to an extent of at least 90% and preferably 95%, based on the total number of double bonds in the block polymer. These polymers are well known, see Houben-Weyl, Methoden der organischen Chemie, Georg Thieme Verlag, Stuttgart, Vol. 14/1, page 659 (1961).

Graft polymers of styrene and polyolefin are also well known. They are prepared by free-radical polymerization of styrene on polyolefins, see German Published Application 1,495,813.

The foams are prepared by mixing the said polymers with an expanding agent under a pressure capable of preventing foaming of the mixture. The components are heated at temperatures above the crystallite melting point of the polyolefin, mixing being preferably carried out at temperatures which are from 10° to 100° C above the crystallite melting point of the polyolefin. The temperature at which mixing is carried out is governed, for example, by the polymer used and is generally from 70° to 250° C.

Particularly suitable expanding agents are halohydrocarbons containing 1 or 2 carbon atoms in the molecule, e.g. methyl chloride, ethyl chloride, dichloromethane and chlorofluorohydrocarbon such as dichlorodifluoromethane, trichlorofluoromethane, monofluoromonochloromethane, 1,2,2-trifluorotrichloroethane and 1,1,2,2-tetrafluorodichloroethane. Also suitable are saturated or unsaturated hydrocarbons containing from 3 to 8 carbon atoms, such as propane, butane, pentane, hexane, heptane, octane, propene, butene, pentene, hexene, heptene and branched-chain saturated hydrocarbons such as isobutane, isopentane and 2,2-dimethylbutane. Mixtures of said expanding agents may also be used. The amount of expanding agent used is from 5 to 30% by weight of the weight of the mixture of olefin polymer and styrene polymer.

In addition to the above materials, other materials may be included in the mixture used in the process of the invention, for example conventional additives such as lubricants and also nucleating agents such as talcum, magnesium oxide, calcium oxide and zinc stearate. For some applications it is also advantageous to effect crosslinking. Crosslinking is then carried out concurrently with foaming. Suitable agents for this purpose are peroxides and azo compounds, for example di-t-butyl peroxide, benzoyl peroxide, dicumyl peroxide, di-isopropyl peroxide, ethyl hydroperoxide and diazodiisobutyronitrile.

The mixtures are maintained under pressures which are above the pressure of the expanding agent at the temperature of mixing. This prevents premature foaming of the mixture. The mixture is cooled to a temperature which lies between 20° C above and 20° C below the crystallite melting point of the olefin polymer. The homogeneous mixture is then relaxed in a zone in which the pressure is below the pressure of the expanding agent at the mixing temperature, as a result of which the mixture foams. It is most convenient to relax the mixture in a zone in which the pressure is atmospheric. To improve distribution of the expanding agent in the mixture, a waiting period may be inserted prior to relaxation. Waiting periods of from 10 to 60 minutes may be advantageous.

The process of the invention produces semi-rigid to rigid foams having densities of from 10 to 200 g/l. By varying the temperature during extrusion of the foamable mixture and varying the expanding agent used, the foams produced have varying proportions of open and closed cells. Usually, the proportion of open cells is from 10 to 70%. The diameter of the individual cells may vary between wide limits, for example from 0.1 to 2 mm.

The foams are resistant to all common organic solvents at room temperature. For example, they may be bonded with all commercially available solvent-base adhesives. The foams are particularly useful in the building industry.

The invention is further illustrated with reference to the following Examples, in which the parts are by weight. The melt index of the polymers is determined by ASTM D 1239-65 T. The hydrogenated styrene/butadiene block polymer contains in each case 40% by weight of styrene.

EXAMPLE 1

80 parts of polyethylene having a density of 0.92 g/cm$^3$, a melting point of 109° C and a melt index (190° c/2.16 kg) of 1.5 g/10 min. are mixed in an extruder with 20 parts of polystyrene having a density of 1.05 g/cm$^3$ and a melt index (200° C/5 kg) of 1.2 g/10 min., with the addition of 3 parts of hydrogenated styrene/butadiene block polymer having a molecular weight of 120,000 and 3 parts of talcum, the mixing temperature being 150° C. The mixture is then granulated. Microscopic photographs of the mixture show that the polystyrene particles have a particle size of less than 50 $\mu$ and that the continuous phase of the mixture is formed by the polyethylene.

In an extruder, 25 kg/hr of the above mixture are continuously mixed with 5 kg/hr of an expanding agent mixture consisting of 60 parts of methyl chloride and 40 parts of butane, under pressure at a temperature of 140° C. The homogeneous melt containing expanding agent is then cooled to a temperature of 105° C and is extruded through a sheeting die measuring 3.1 × 200 mm to a zone of atmospheric pressure. There is obtained a semi-rigid, closed-cell foam in the form of sheeting having a thickness of 8 cm. The density of the foam is 40 g/l.

EXAMPLE 2

60 parts of polyethylene having a density of 0.95 g/cm$^3$, a melting point of 132° C and a melt index (190° C/2.16 kg) of 2, are mixed with 40 parts of polystyrene having a density of 0.5 g/cm$^3$ and a melt index (200° C/5 kg) of 1.2 and with 3 parts of talcum and 5 parts of a hydrogenated styrene/butadiene block polymer having a molecular weight of 180,000 in a kneader at a temperature of 150° C. The diameter of the polystyrene particles in the mixture may be varied by varying the duration of kneading. Following a kneading period of 10 minutes the polystyrene particles have a diameter of 20 $\mu$.

25 kg/hr of this mixture are continuously mixed with 5 kg/hr of an expanding agent mixture consisting of 50 parts of methyl chloride and 50 parts of butane, under pressure at a temperature of 150° C in an extruder. The homogenized melt containing expanding agent is cooled under pressure to a temperature of 110° C and then relaxed via a sheeting die measuring 3.1 × 200 mm. There is obtained a foamed extrudate having a density of 30 g/l. The foam is rigid, has a percentage of open cells of 15% and is resistant to all common organic solvents at room temperature.

EXAMPLE 3

A mixture of 50 parts of an ethylene/vinyl acetate copolymer containing 12% by weight of vinyl acetate and having a density of 0.93 g/cm$^3$, a crystallite melting point of 102° C and a melt index (190° C/2.16 kg) of 4 and 50 parts of polystyrene having a density of 1.05 g/cm$^3$ and a melt index of 0.7 g/10 min. (200° C/5 kg) and 2 parts of a hydrogenated styrene/butadiene block polymer having a molecular weight of 80,000 is foamed by the method described in Example 2. The polystyrene particles in the mixture have a diameter of 5 $\mu$. Whereas the melt containing expanding agent is cooled to a temperature of 110° C in Example 2, the extrusion temperature in the present instance is 95° C. There is obtained a rigid foam containing 15% of open cells and having a density of 25 g/l. The foam may be bonded with common solvent-base adhesives.

If, in place of the expanding agent mixture of methyl chloride and butane, the same weight of methyl chloride is used and the extrusion temperature is set at 110° C, there is obtained a closed-cell foam having a density of 30 g/l. This foam is also resistant to organic solvents at room temperature.

EXAMPLE 4

A homogeneous mixture is prepared in an extruder at a temperature of 140° C from 40 parts of the ethylene copolymer described in Example 3, 60 parts of polystyrene having a density of 1.05 g/cm³ and a melt index (200° C/5 kg) of 1.2 and 3 parts of a hydrogenated styrene/butadiene block polymer having a molecular weight of 80,000. The mixture is then granulated.

The polystyrene particles in the mixture have a diameter of 8 μ.

25 kg of the above mixture are mixed in an extruder at a temperature of 98° C with 5 kg of methyl chloride, under pressure, and the mixture is cooled under pressure to a temperature of 95° C and then extruded through a sheeting die measuring 3.1 × 200 mm. There is obtained a rigid foam having 12% of open cells and a density of 20 g/l.

A sample of the foam is placed in butyl acetate. There is no change in shape. By contrast, a similar sample of pure polystyrene foam or comparable density is immediately dissolved by butyl acetate.

COMPARATIVE EXAMPLE

Example 4 is repeated except that the hydrogenated styrene/butadiene block polymer proposed by the invention is omitted. Foaming is carried out in the same manner to give a foam which loses its shape immediately after extrusion and has a density, after cooling, of 120 g/l. A sample placed in butyl acetate loses its shape and the foam disintegrates into a number of portions.

EXAMPLE 5

Example 3 is repeated except that in place of hydrogenated styrene/butadiene block polymer 6 parts of a graft copolymer of styrene on polyethylene are used, the polyethylene therein having a melt index (190° C/2.16 kg) of 22 and a density of 0.915 g/cm³, whilst the content of grafted styrene is 20% by weight, based on the graft copolymer. There is obtained a rigid foam having 20% of open cells and a density of 29 g/l.

EXAMPLE 6

20 parts by weight of polyethylene having a density of 0.92 g/cm³, a melting point of 109° C and a melt index (190° C/2.16 kg) of 1.5 g/10 min. are mixed with 80 parts of polystyrene having a density of 1.05 g/cm³ and a melt index (200° C/5 kg) of 1.2 g/10 min., in an extruder at a temperature of 180° C, 3 parts of a hydrogenated styrene/butadiene block copolymer having a molecular weight of 120,000 and 3 parts of talcum being added. The mixture is then granulated. The polystyrene particles have a diameter in the range 0.5 to 5 μ. Polyethylene forms the continuous phase.

In an extruder, 25 kg/hr of the above mixture are continuously mixed with 5 kg/hr of an expanding agent mixture consisting of 80 parts of methyl chloride and 20 parts of butene, at a temperature of 160° C under pressure. The homogeneous melt containing expanding agent is then cooled to a temperature of 108° C and is extruded through a sheeting die measuring 3.1 × 200 mm to a zone of atmospheric pressure. There is obtained a closed-cell foam in the form of sheet having a thickness of 8.5 cm. The density of the foam is 26 g/l.

We claim:

1. Extrusion-foamable composition of polyolefins and styrene polymers, which comprises a mixture of
   a. 5 to 90% by weight of ethylene or propylene polymers,
   b. 10 to 95% by weight of styrene polymer,
   c. 0.5 to 10% by weight, based on the combined weight of polyolefin (a) and styrene polymer (b), of a hydrogenated styrene/butadiene block polymer and
   d. 5 to 30% by weight, based on the combined weight of polyolefin (a) and styrene polymer (b), of at least one low-boiling expanding agent, said styrene polymer (b) having a higher molecular weight, measured by the melt index, than that of the polyolefin (a) and is finely dispersed in the polyolefin (a) forming the continuous phase, and said hydrogenated styrene/butadiene block polymer (c) having a viscosity average moleclar weight of from 3,000 to 800,000.

2. A composition as set forth in claim 1 wherein said styrene polymer is selected from the group consisting of polystyrene, poly(-methylstyrene) and copolymers of styrene with -methylstyrene.

3. A composition as set forth in claim 1 wherein the amount of said block polymer incorporated into the mixture is from two to eight percent.

4. A composition as set forth in claim 1 wherein molecular weight of said block polymer is from 10,000 to 100,000.

5. A composition as set forth in claim 4, wherein the proportion of styrene in said block polymer is from 10 to 80% by weight.

6. A composition as set forth in claim 4 wherein the proportion of styrene in said block polymer is from 30 to 60% by weight.

7. A composition as set forth in claim 6, wherein said polyolefin is polyethylene.

8. A composition as set forth in claim 6, wherein said polyolefin is a copolymer of ethylene containing from 55 to 90% by weight of ethylene units.

* * * * *